United States Patent
Wilder et al.

(10) Patent No.: US 11,677,265 B2
(45) Date of Patent: Jun. 13, 2023

(54) CONTROLLERS FOR UNINTERRUPTIBLE POWER SUPPLIES AND METHODS OF OPERATING THE SAME

(71) Applicant: Eaton Intelligent Power Limited, Dublin (IE)

(72) Inventors: Vincent Edward Wilder, Benson, NC (US); George Arthur Navarro, Raleigh, NC (US); Steven Andrew Moore, Raleigh, NC (US); Amit G. Kolge, Prune (IN)

(73) Assignee: Eaton Intelligent Power Limited, Dublin (IE)

( * ) Notice: Subject to any disclaimer, the term of this patent is extended or adjusted under 35 U.S.C. 154(b) by 156 days.

(21) Appl. No.: 17/112,148

(22) Filed: Dec. 4, 2020

(65) Prior Publication Data
US 2021/0091595 A1    Mar. 25, 2021

Related U.S. Application Data

(63) Continuation-in-part of application No. 16/798,898, filed on Feb. 24, 2020, now Pat. No. 11,239,665.

(60) Provisional application No. 62/810,100, filed on Feb. 25, 2019.

(51) Int. Cl.
 *H02J 9/06* (2006.01)
 *H02J 3/32* (2006.01)
 *H02J 3/46* (2006.01)

(52) U.S. Cl.
 CPC ............... *H02J 9/062* (2013.01); *H02J 3/32* (2013.01); *H02J 3/466* (2020.01)

(58) Field of Classification Search
 None
 See application file for complete search history.

(56) References Cited

U.S. PATENT DOCUMENTS

| | | | |
|---|---|---|---|
| 2003/0025397 A1* | 2/2003 | Young | H02J 9/062 307/64 |
| 2014/0368042 A1 | 12/2014 | Giuntini et al. | |
| 2015/0142201 A1 | 5/2015 | Forbes, Jr. | |
| 2017/0016961 A1* | 1/2017 | Lucea | B60L 58/16 |
| 2018/0006964 A1 | 1/2018 | Joppa et al. | |

(Continued)

FOREIGN PATENT DOCUMENTS

| | | |
|---|---|---|
| WO | WO 2008/015502 | 2/2008 |
| WO | WO 2013/152397 | 10/2013 |

OTHER PUBLICATIONS

Notification of Transmittal of International Search Report and Written Opinion; corresponding application No. PCT/EP2020/025093; dated Apr. 6, 2020.

(Continued)

*Primary Examiner* — Jared Fureman
*Assistant Examiner* — Joel Barnett
(74) *Attorney, Agent, or Firm* — Stanek Lemon Crouse & Meeks, P.A.

(57) ABSTRACT

An uninterruptible power supply (UPS) is operated to selectively provide energy to a critical load from a grid and an energy storage device and to transfer energy between the energy storage device and the grid. A controller causes the UPS to selectively support bidirectional and unidirectional transfers of energy between the grid and the energy storage device based on a state of charge (SOC) of the energy storage device.

10 Claims, 9 Drawing Sheets

(56) References Cited

U.S. PATENT DOCUMENTS

| | | | |
|---|---|---|---|
| 2018/0123347 A1* | 5/2018 | Shizuno | H02J 7/00 |
| 2019/0067986 A1* | 2/2019 | Haj-Maharsi | H01M 10/446 |
| 2019/0280492 A1* | 9/2019 | Haj-Maharsi | H02J 3/32 |
| 2020/0144845 A1* | 5/2020 | Facchini | H02J 9/061 |
| 2020/0274367 A1 | 8/2020 | Navarro et al. | |

OTHER PUBLICATIONS

European Search Report dated Apr. 21, 2022, for EP 21212485.3.

* cited by examiner

CONTROLLERS FOR UNINTERRUPTIBLE POWER SUPPLIES AND METHODS OF OPERATING THE SAME

CROSS-REFERENCE TO RELATED APPLICATIONS

The present application is a continuation-in-part and claims the benefit of U.S. patent application Ser. No. 16/798,898 entitled "Grid Edge Controllers for Uninterruptible Power Supplies", filed Feb. 24, 2020, which claims the benefit of U.S. Provisional Patent Application Ser. No. 62/810,100 entitled "Grid-Aware UPS System," filed Feb. 25, 2019, the disclosures of both of which are incorporated herein by reference in their entirety.

BACKGROUND

The inventive subject matter relates to uninterruptible power systems (UPSs) and methods of operating the same and, more particularly, to grid-connected UPSs and methods of operating the same.

Datacenter customers typically want an uninterruptible power supply (UPS) solution that offers power quality and critical power backup required of their mission critical operations. Increasingly, however, they may also want an advanced UPS that can provide energy ancillary services, such as demand response in the form of peak shaving and frequency regulation. Such capabilities can allow the customer to use previously untapped and inaccessible battery capacity, which can improve return on investment (ROI) in equipment and a reduction of total cost of operation (TCO).

SUMMARY

Some embodiments of the inventive subject matter provide a system including an uninterruptible power supply (UPS) configured to selectively provide energy to a critical load from a grid and an energy storage device and to transfer energy between the energy storage device and the grid. The system further includes a controller configured to cause the UPS to selectively support bidirectional and unidirectional transfers of energy between the grid and the energy storage device based on a state of charge (SOC) of the energy storage device. The controller may be configured to prevent energy transfers from the grid to the energy storage device responsive to the SOC reaching a maximum active SOC while continuing to allow transfers from the energy storage device to the grid after the SOC reaches the maximum active SOC, and may resume allowing transfers from the grid to the energy storage device responsive to the SOC reaching a level a predetermined amount less than the maximum active SOC. In further embodiments, the controller may be configured to prevent energy transfers from the energy storage device to the grid responsive to the SOC reaching a minimum active SOC while continuing to allow transfers from the grid to the energy storage device after the SOC reaches the minimum active SOC, and may resume allowing transfers from the grid to the energy storage device responsive to the SOC reaching a level a predetermined amount greater than the minimum active SOC. The controller may be configured to communicate with a grid operator and to cause the UPS to transfer energy between the grid and the energy storage device responsive to communication with the grid operator.

According to further aspects, the controller may be configured to vary a response to a request for transfer of energy received from the grid operator based on a performance criterion for a group of UPSs and energy storage devices connected to the grid. The controller may be configured to vary a response to a request for transfer of energy received from the grid operator based on a performance criterion for a group of UPSs and energy storage devices connected to the grid.

According some embodiments, the controller may be configured to cause the UPS to selectively bidirectionally and unidirectionally transfer energy between the grid and the energy storage device based on relationship of the SOC of the energy storage device to a predetermined SOC range. The controller may be configured to adjust the SOC range based on, for example, a performance criterion associated with the UPS and/or a performance criterion associated with a plurality of UPSs.

Some embodiments provide a system including an uninterruptible power supply (UPS) configured to selectively provide energy to a critical load from a grid and an energy storage device and to transfer energy between the energy storage device and the grid and a controller configured to cause the UPS to selectively support bidirectional and unidirectional transfers of energy between the grid and the energy storage device based on a relationship of a state of charge (SOC) of the energy storage device to an SOC range having a lower bound greater than a critical reserve SOC representing an amount of energy allocated to providing backup energy for the critical load. The controller may be configured to communicate with a grid operator and to cause the UPS to transfer energy between the grid and the energy storage device responsive to communication with the grid operator. The controller may be configured to vary a response to a request for transfer of energy received from the grid operator based on a performance criterion for a group of UPSs and energy storage devices connected to the grid.

In some method embodiments, an uninterruptible power supply (UPS) is operated to selectively provide energy to a critical load from a grid and an energy storage device and to transfer energy between the energy storage device and the grid. A controller causes the UPS to selectively support bidirectional and unidirectional transfers of energy between the grid and the energy storage device based on a state of charge (SOC) of the energy storage device.

DETAILED DESCRIPTION

Figure 1:
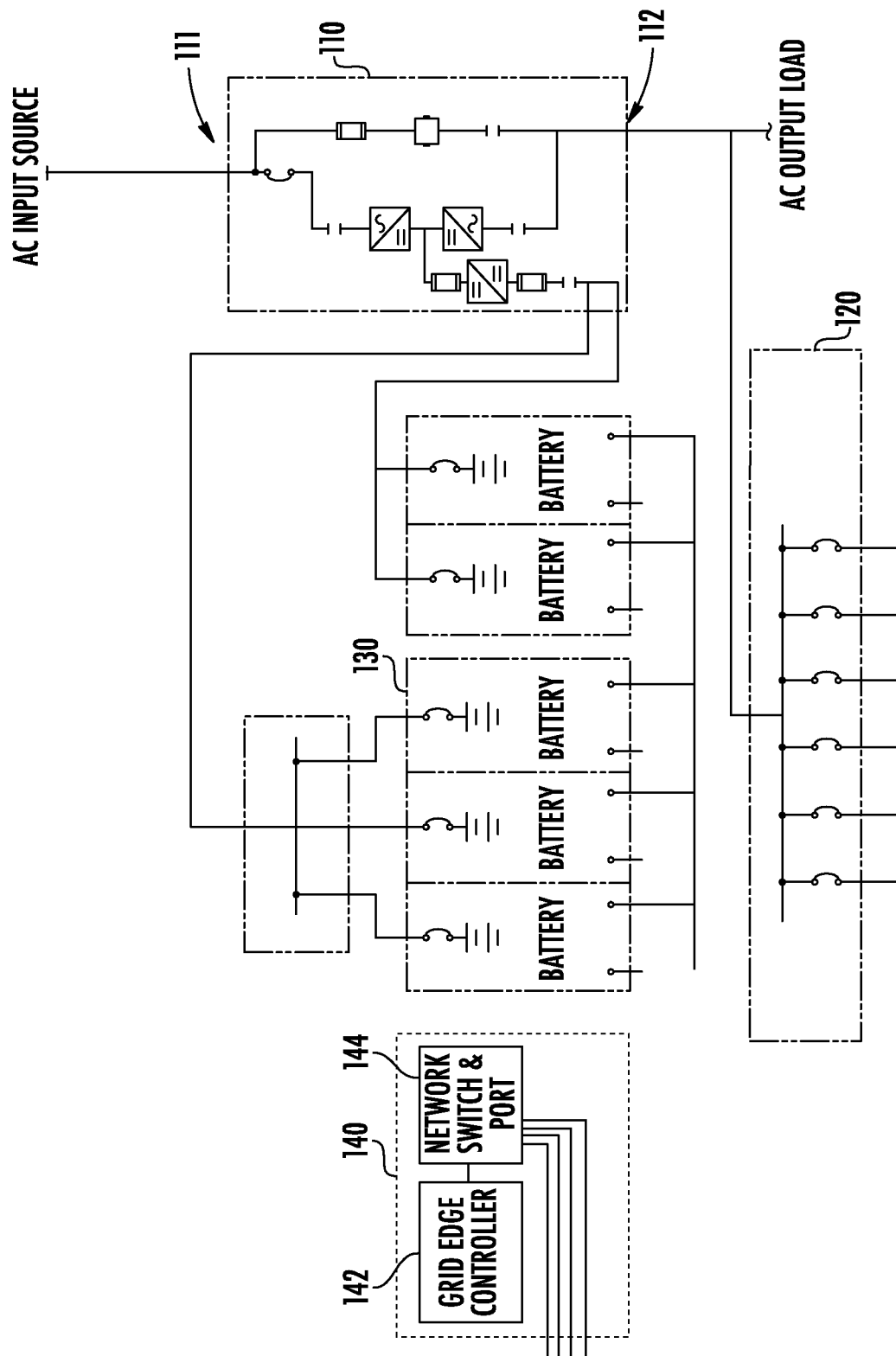
FIG. 1 is schematic diagram illustrating a system with a UPS and grid edge controller according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates an exemplary system for enabling a UPS 110 to be used as such DER. The UPS 110 has its input 111 coupled to an AC grid and is configured to serve a critical load coupled to its output 112 via, for example, a power distribution unit (PDU) 120. A bank of batteries 130 is coupled to the UPS 110 and is used to support the critical load when power from the grid is interrupted or degraded.

According to some embodiments, the UPS 110 may be enabled as a DER using a grid edge controller 140, which can implement an energy control regime that supports energy ancillary services, such as peak shaving and frequency control, while leaving the UPS 110 to continue to operate autonomously as a critical backup power source for IT or the critical load. The grid edge controller 140 includes a grid edge controller 142 that communicates with a controller API in the UPS 110 via, for example, a network switch 144. The grid edge controller 142 may support network connectivity to allow configuration of the controller 140 to provide certain ancillary energy services using the UPS 110.

For example, the grid edge controller 142 may implement an operational schedule for the UPS 110 that operates the UPS 110 to provide grid ancillary services in various modes dependent on the time of day. For example, the schedule may cause the grid edge controller 142 to operate the UPS in a peak shaving mode for a particular time of day, causing the UPS 110 to deliver power from the battery bank 120 to the load to limit the amount of power the UPS 110 draws from the grid during the subject time period. Support of such a scheduled operation may include causing the UPS 110 to previously charge the battery bank 120 to a level appropriate for supporting the peak shaving operation, which may be a capacity at or near the maximum available for the battery bank 120. Such charging may occur, for example, during a preceding lower period of lower energy rates (or off-peak period), such as during the night or periods of low energy congestion on the grid.

In another example, the control schedule for the grid edge controller 142 may also include period in which the UPS is to operate in a frequency regulation mode. In such a mode, the UPS 110 may source and sink power to the grid operator to compensate for frequency variation on the grid. In contrast to the peak shaving mode, before operating in the frequency regulation mode, the grid edge controller 142 may cause the UPS 110 to take the battery bank 120 to a state of charge (SOC) that may be approximately half the maximum capacity of the battery bank 120 to enable the battery bank 120 to effectively source and sink power in turn maximum the time the UPS participates in this grid ancillary service.

According to further aspects, the grid edge controller 142 may also provide a grid security compliant interface for using the UPS 110 as a DER. In some retrofit applications, for example, the UPS 110 may be a UPS manner that was not designed to be coupled to the grid control network and may not be grid security compliant to prevent or reduce the likelihood of intrusions. The grid edge controller 142 may employ hardware and software that is compliant with security requirements of the grid, thus allowing the UPS 110 to be safely used with the grid in a DER application.

According to further aspects, the grid edge controller 142 may also provide a user interface to allow a UPS customer to monitor and control the schedule implemented by the grid edge controller 142, as well as parameters used by the grid edge controller 142, such as mapping of the capacity of the battery bank 120 for critical power and ancillary services. For example, FIG. 2 illustrates a web page that may be hosted by the grid edge controller 142, providing a dashboard that informs the customer of the state of the system and its constituent parts, including the current mode of the UPS 110, the current state of charge (SOC) of the battery bank and its current capacity allocation, input and output power meters and a current mode of the grid edge controller 142.

Figure 2:
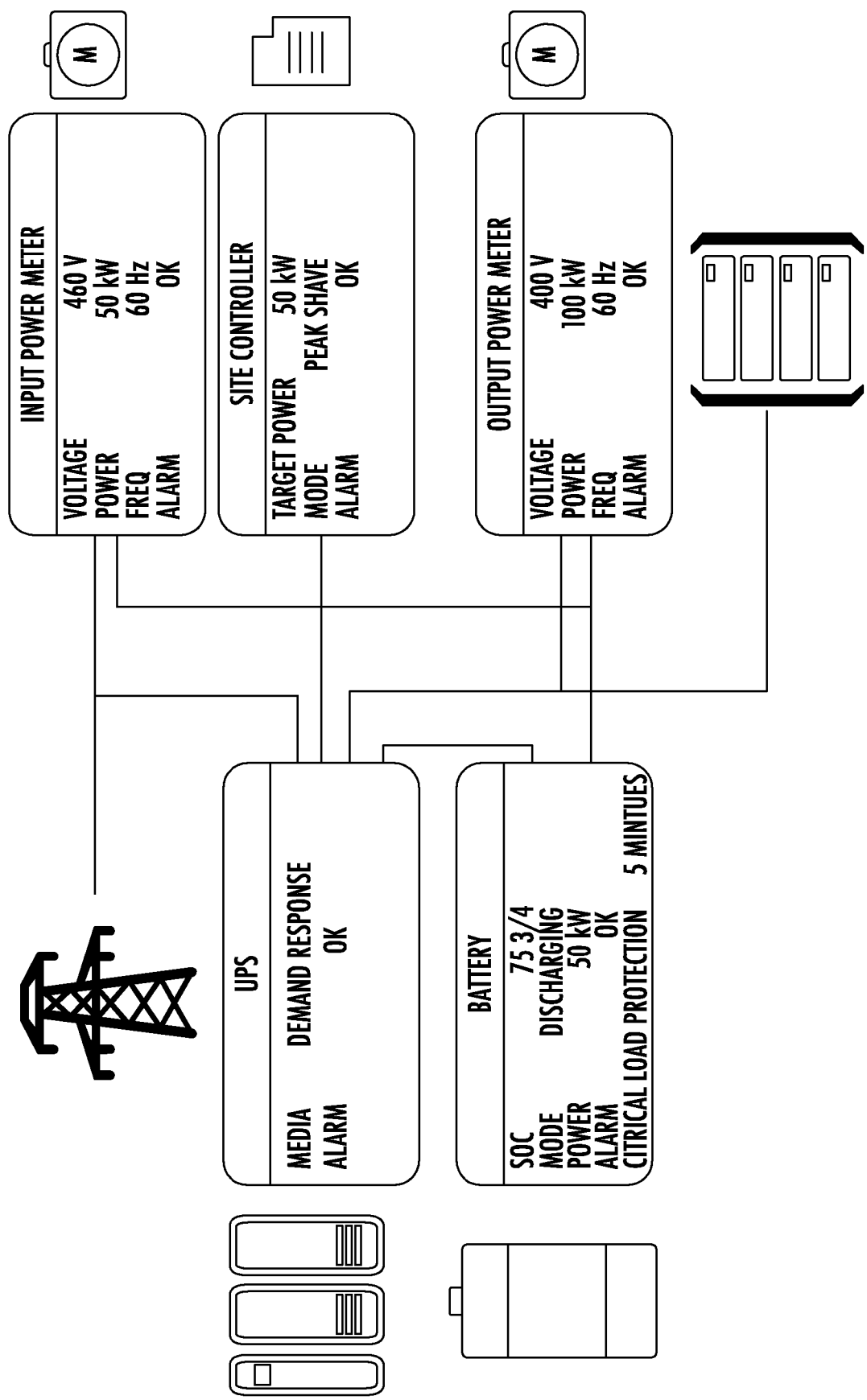
FIGS. 2-4 illustrate web pages of a grid edge controller user interface according to some embodiments.
Figure 3:
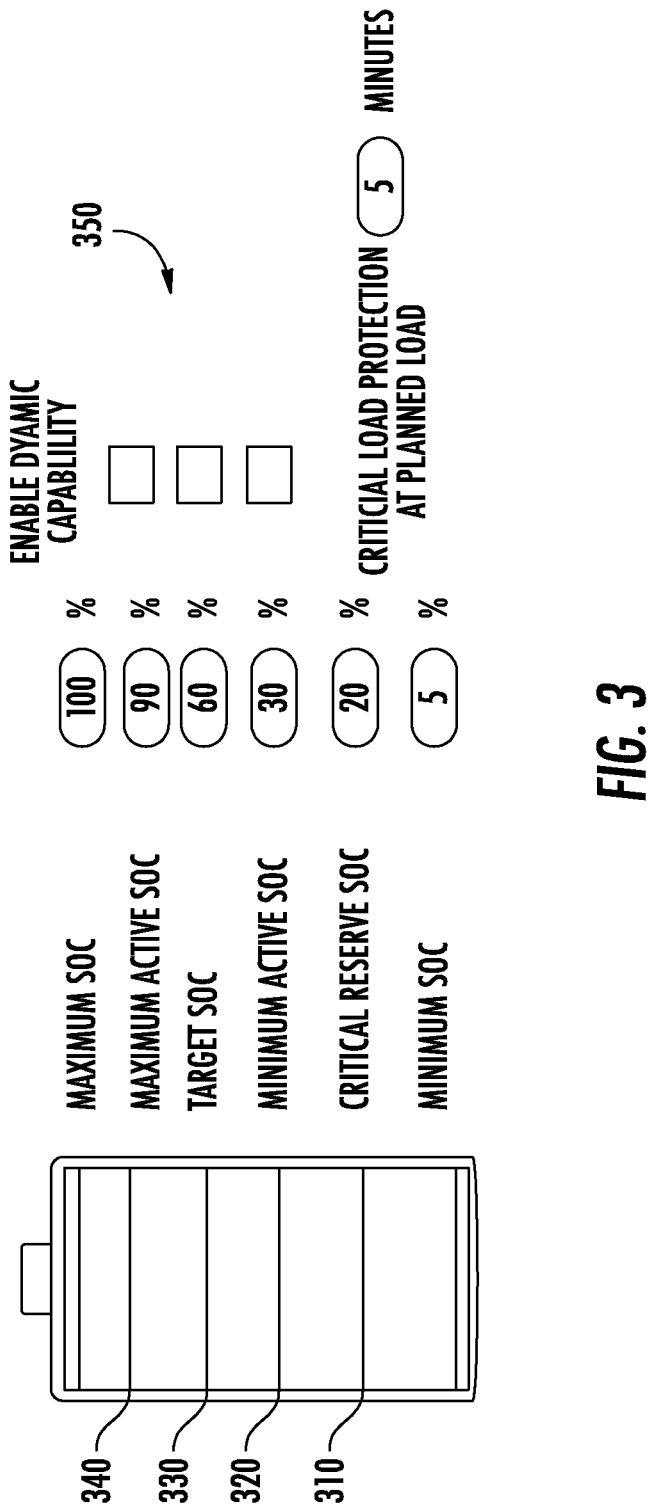

FIG. 2 illustrates a web page that indicates status of UPS and associate energy storage battery, indicating, for example, the mode in which the UPS is operating, the state of charge of the battery and its mode of operation, and the states of various input and output parameters monitored by the grid edge controller 142. FIG. 3 illustrates a web page hosted by the grid edge controller 142 that may be used by the customer to set or allocate battery capacity for critical power and energy ancillary services. As shown, for example, the customer can set a critical reserve state of charge (SOC) threshold 310, which represents the minimum capacity needed to ensure that the critical load may be served for a specified amount of time, here shown as five minutes. The grid edge controller 142 may be programmed to ensure that the battery bank SOC never falls to this level under normal (non-emergency) operation. To help preserve the critical reserve, the customer may set a higher minimum active SOC 320 that can serve as a threshold for disabling ancillary energy services, i.e., if the battery bank SOC falls below this level, the services may be discontinued. Similarly, the customer may establish a maximum active SOC 330, which may serve as a threshold for disabling active services, such as frequency regulation, that might cause the battery bank to exceed this level. The customer may also establish a maximum SOC 340, representing a threshold that reduces the likelihood of overcharging, and a minimum SOC, to reduce the likelihood of overly deep discharging of the battery bank. Target SOC is related to the energy ancillary service and represents the initial or ideal SOC for the upcoming or schedule grid ancillary service; the grid edge controller charges or discharges the battery to the Target SOC just prior to the grid ancillary.

Dynamic capability of specific grid edge controller parameters allows the datacenter operator to adjust/adapt the operation of the UPS DER as-required to maximize utilization of the DER battery capacity. Were it not for the ability to make such run-time adjustments the operation of the grid edge controller and the UPS would be static in nature forcing the user to live with the particular setup or combination of parameters established at initialization. The datacenter DER with dynamic capability also maximizes the availability of the UPS as DER by avoiding shutting down of the UPS to re-initialize edge controller parameters to align with datacenter operational plans which are dynamic in nature. Additionally, dynamic capability can be enabled or disabled selectively as shown by the checkboxes 350 used to enable and disable dynamic capability on a parameter-by-parameter basis; providing another degree of freedom of control for the DER operator.

The grid edge controller 142 can support a variety of different types of energy ancillary services, such as time of use (TOU) demand charge management. Demand charges can represent a substantial portion of the commercial customers' monthly energy bill. Rate structures vary depending on geographical location, and rates may change due to changes in rate policies and energy programs. Unmanaged power demand can create coincident peak penalties and unexpected/unfavorable site power levels and undesirable rate reclassifications. According to some embodiments, an arrangement along the lines described above with reference to FIG. 1 may be used to turn a UPS and battery equipment resource into a demand charge management device and reduce energy bills and avoid costly penalties.

Figure 4:
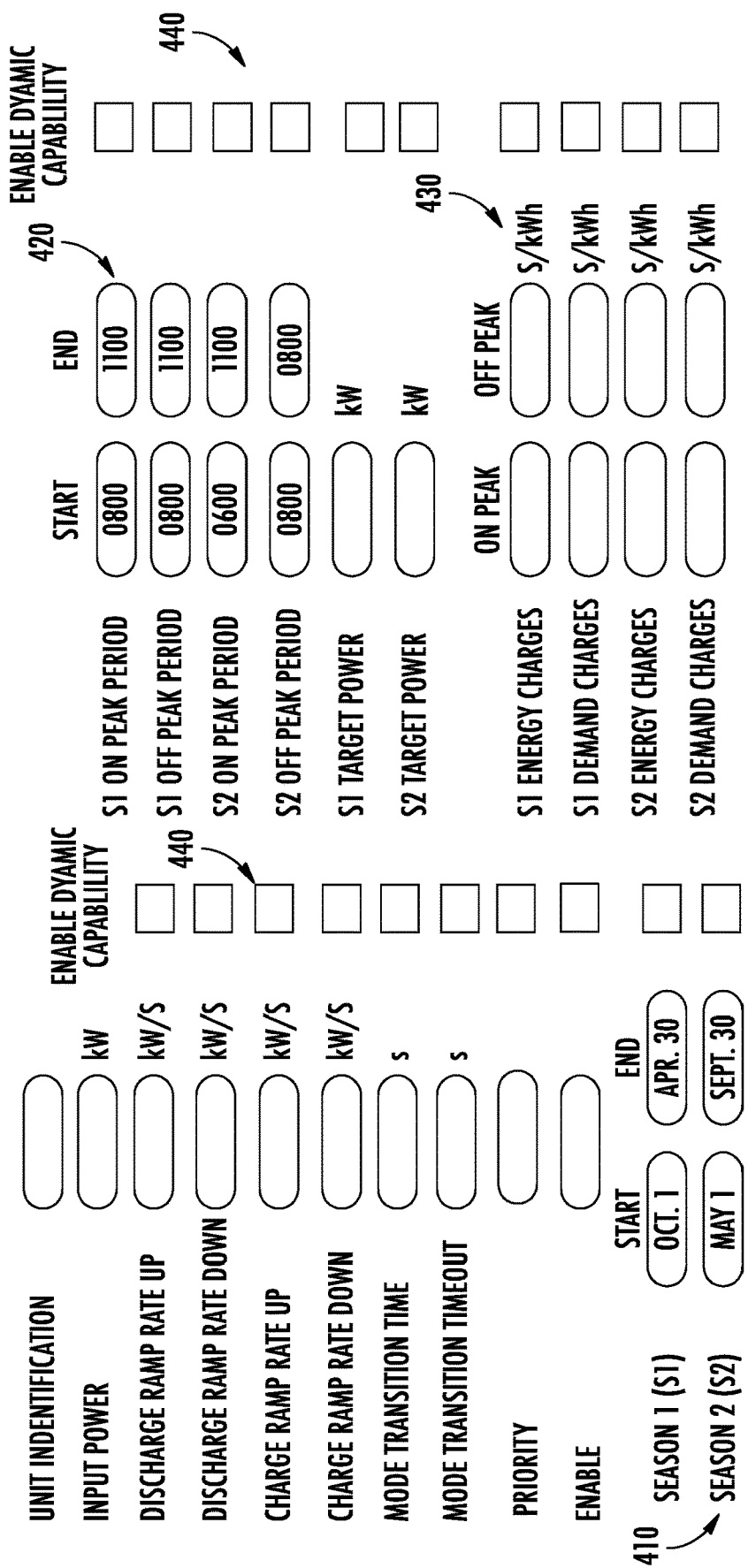

FIG. 4 illustrates an example web page that may be supported by the grid edge controller 142 as part of providing such TOU demand charge management. This web page enables the customer to enter parameters for operation of the grid edge controller 142, allowing the customer to set such values as season date ranges 410, peak and off-peak periods 420 for the various seasons, and energy charges 430 that apply to the various periods, etc. These allow the grid edge controller 142 to be configured to meet the particular needs of the application. As with the parameters shown in FIG. 3, checkboxes 440 or similar input features may be used to selectively allow dynamic reconfiguration of these parameters.

A configuration along the lines of FIG. 1 can also be used to support real-time pricing demand response. A datacenter customer may participate in energy wholesale markets to achieve lowest energy prices. However, at key times, the customer may experience high price volatility typical of wholesale pricing. The grid edge controller 142 of the system of FIG. 1 can process a real-time pricing command from the customer's network, for example, an alert email or other pricing signal from the utility operator and responsively cause the UPS 110 to use energy stored in the battery bank 130 to reduce demand. For example, the grid edge controller 142 may modify its time of use demand charge management profile (e.g., FIG. 4) to reflect such a real time pricing input. The grid edge controller 142 can take advantage of low real-time energy prices in off-peak periods to restore energy to the battery bank. In this manner, the datacenter can avoid higher real-time prices typically seen around periods of high grid congestion and stress. This can result in a lower total cost of operation and may also enable the datacenter to take advantage of capacity reserve payments granted to qualifying loads under special short and interim term distributed resource contracts.

Figure 5:
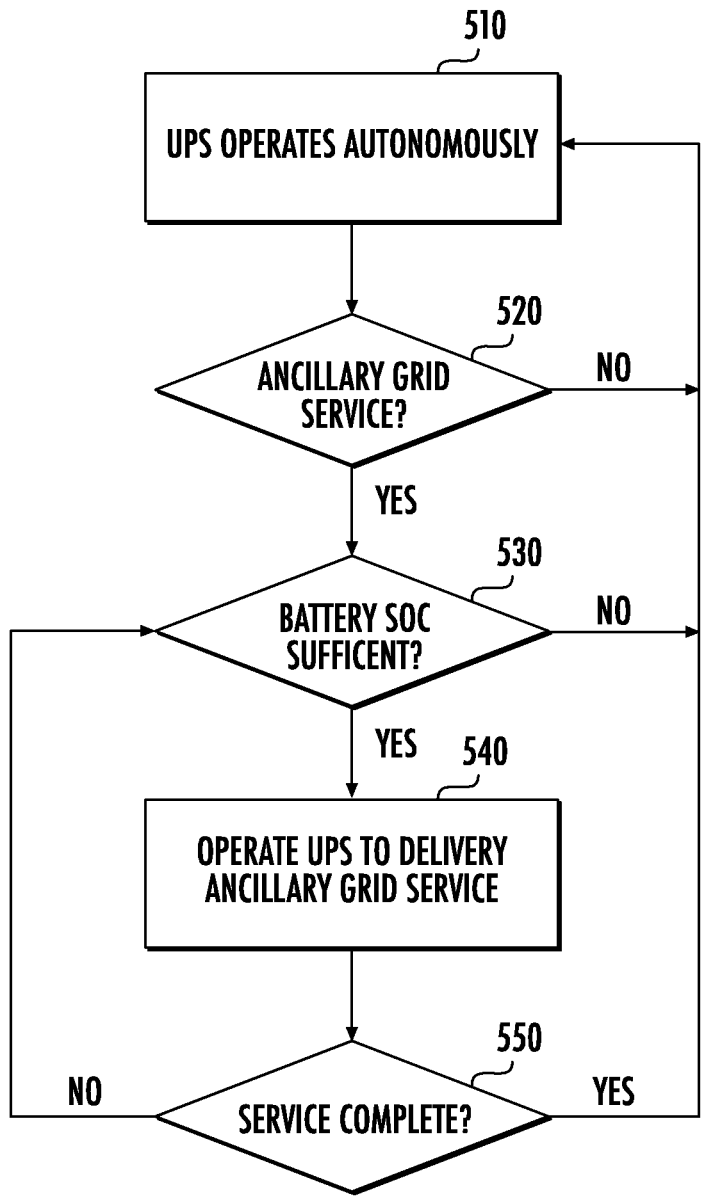
FIG. 5 is a flowchart illustrating operations of a grid edge controller according to some embodiments.

FIG. 5 is a flowchart illustrating exemplary operations of the system of FIG. 1 according to some embodiments. The UPS 110 operates in a normal mode in which it may autonomously react to a power outage or degradation to maintain service to the critical load (block 510). Upon determination that an ancillary grid service is to be provided (block 520), the system may determine whether the battery SOC is appropriate to perform the service without, for example, undermining the ability of the UPS 110 to serve the critical load in the event of an outage or other degradation of service (block 530). If the SOC is not appropriate, the ancillary grid service may not be provided, and the UPS may continue its normal autonomous operation. If the SOC is appropriate, the grid edge controller 142 can cause the UPS to deliver the ancillary grid service (block 540). If the battery SOC becomes inappropriate while providing the ancillary grid service, the system can terminate the service and return to autonomous UPS operation (blocks 550, 530, 510). Similarly, if the service is complete, the system can also return to autonomous UPS operation (blocks 550, 510).

Like other DERs, UPS may be highly distributed as parts of a complex electrical infrastructure typical of a datacenter operation. According to some embodiments, coordination and scheduling of a group of UPS (2, 4, 6, and maybe even more) to form/create a total power for the target energy ancillary service may be achieved by creating an aggregation of these devices so that they act as a unitary resource.

A typical datacenter electrical infrastructure is composed of numerous power distribution branches and sub-branches that are powered by a service entrance transformer and switchboards. The branches are designated feeders and sub-feeders that ultimately power (support) downstream information technology equipment (ITE).

The ITE loads can vary depending on datacenter IT operations and are not necessarily coordinated feeder to feeder. The load level on one feeder can be very different from the load level on another by the random nature ITE activity and traffic. However, IT loads can be controlled/managed through virtualization as a function of energy economics.

A key component on the ITE feeder is the UPS, which may be employed to ensure power quality and critical power objectives of the datacenter. Protection of the critical load is the foremost mission of the UPS and, if designed properly, the UPS will stop at nothing to protect that load against source disturbances, including complete outages. ITE loads are joined by mechanical loads on these subject feeders. The mechanical loads can be located either downstream or upstream of the UPS (more typically upstream).

Typically, there are also parallel redundant feeders and UPSs that do not actively support the load and remain on standby during most of their life. These feeders can be viewed as stranded capacity or capacity that would not otherwise be used or tapped save some energy reduction/storage purpose. The investment in redundancy can potentially pay for itself if while in the idle state it is used to support energy services that may be interest.

Along the lines discussed above, a UPS on a particular feeder can be dual-purposed to support energy services desired by datacenter operators and critical load backup. One example service is demand charge management (DCM). A DCM operational logic nay consider as a key input information regarding load level, source voltage, and battery state-of-charge. Each feeder and subfeeder may have a dedicated power meter to provide metered values (power data).

Datacenter power infrastructure feeders typically are not coordinated. For example, the electrical infrastructure may include submeters that remain independent/autonomous readings (data) that is not combined or related in any manner. An aggregated system may identify the parts of the datacenter electrical infrastructure that are working (consuming meaningful power) and have the potential to produce a net energy savings or other energy feature or performance metric. An aggregator can relate (coordinate) target feeder/UPS's (data) such that they operate as one capacity group or groupings.

Figure 6:
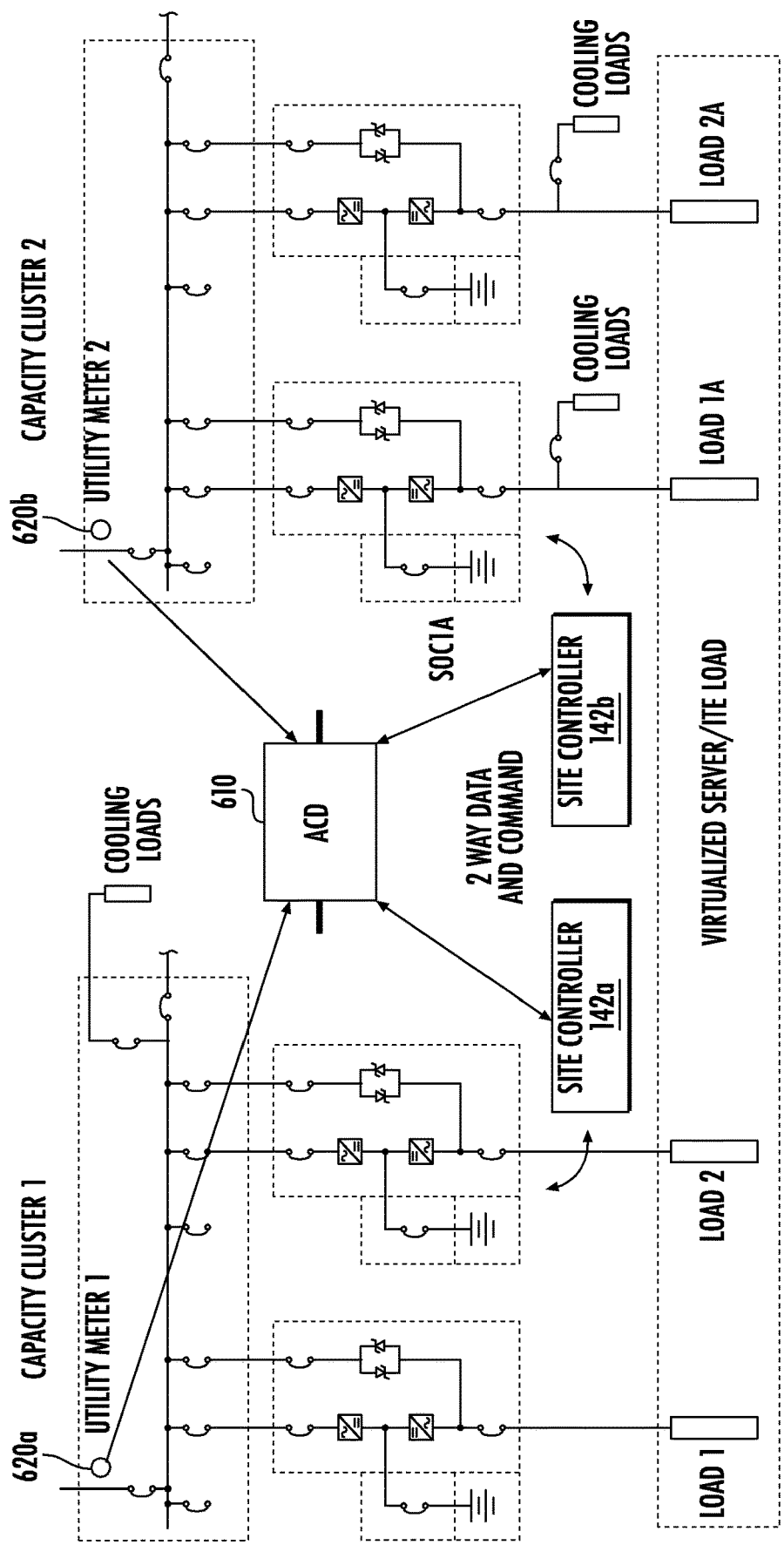
FIG. 6 is a schematic diagram illustrating a system incorporating multiple grid edge controllers and UPSs with an aggregator according to further embodiments.

For example, FIG. 6 illustrates an example of a datacenter power infrastructure including first and second capacity clusters including respective groups of multiple UPSs, each group controlled by a respective grid edge controller 142a, 142b. An aggregator 510 can interact with the multiple grid edge controllers 142a, 142b to enable use of the two capacity clusters and treat them as a combined energy resource, e.g., by coordinating the time of use, battery capacity and other parameters used by the grid edge controllers 142a, 142b.

Time-of-use demand charge management and autonomous frequency regulation according to some embodiments can provide simplifications to the control network where the DER UPS operates both the critical backup and grid ancillary service without input from the grid (e.g., "set and forget"). An autonomous FR mode may be implemented by the UPS sensing the local frequency and pulling/pushing power to some preset frequency/power thresholds (referred to as frequency-watt pairs in the US and frequency containment reserves in Europe).

With the exception of some cooling or facility loads, datacenter load, and IT loads in particular, while fairly constant are also elastic; load elasticity speaks to the ability of the datacenter operation to shift loads to different compute levels. A UPS-based DER according to some embodiments can inform this process and vice-versa. Upstream loads can be controlled/informed/used for "selective self-consumption" wherein behind-the-meter DER's, like a UPS DER along the lines described above, may be restricted (by grid operators and their grid connection rules) to not push power out the facility's point-of-common connection (POC or PCC). The UPS DER can interact with these loads to maintain compliance with grid connection rules/regulations of this sort. In terms for a grid ancillary service, the power of the facility as seen by the grid goes up or down as expected; the requirement of net power production (flowing from the DER to the grid) is not a requirement and may even be a violation. Loads upstream of a DER UPS along the lines described herein may help with this compliance issue.

Some embodiments may be used to implement stacked services, wherein a priority parameter, found on a user interface along the lines described above, can come into play. "Stacked services" refers to the ability to enable (plan for) more than one type of ancillary service to operate over a period of interest, with one service having a known higher priority over another. Priority levels can be a function of the economic value of one ancillary service over another; the economic value, and hence the priority, can vary during different periods. In general, stacking services can improve system ROI since it can increase the realizable revenue or savings (positive cash flow) of the system.

Figure 7:
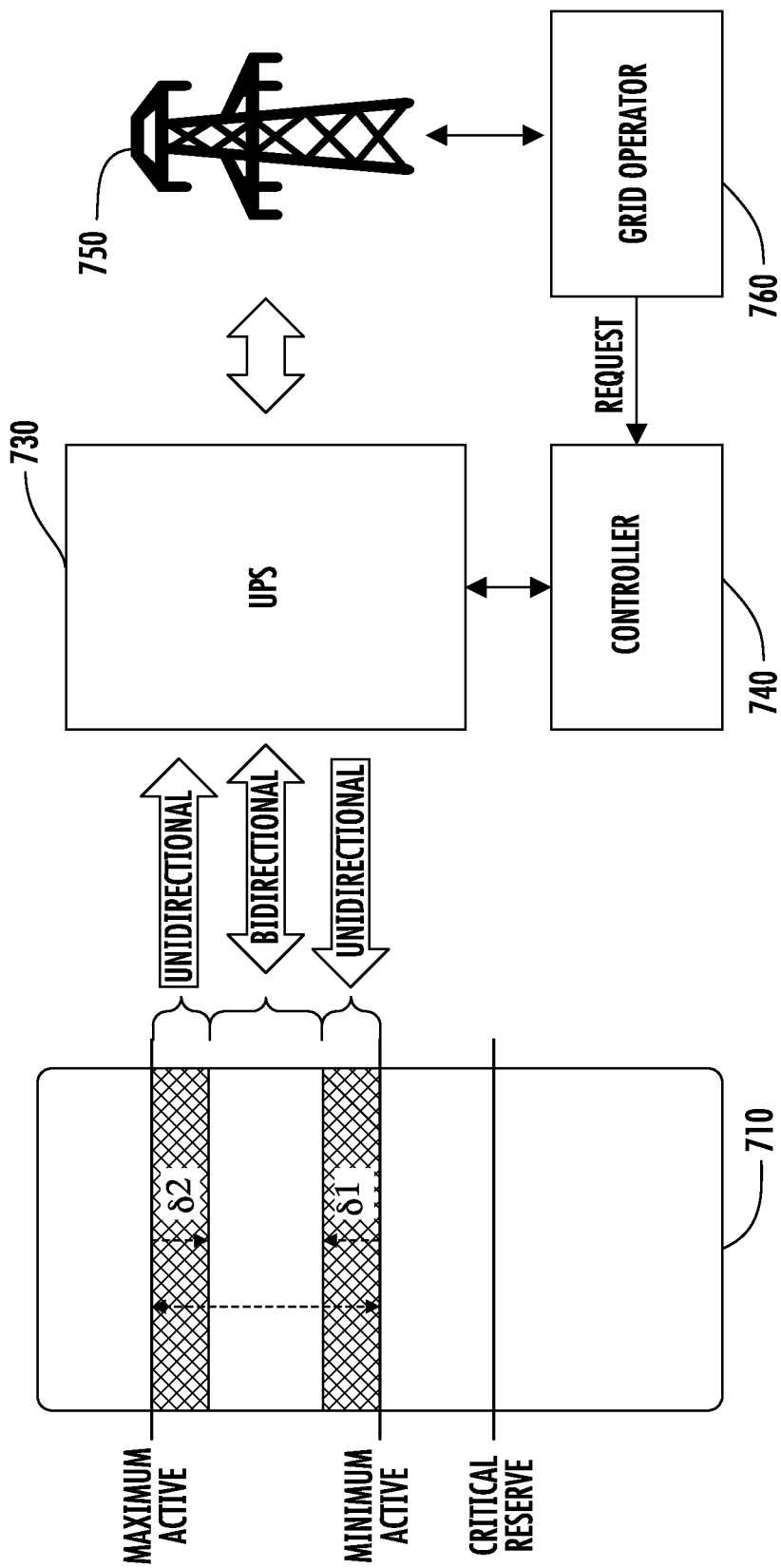
FIG. 7 is a schematic diagram illustrating a system for using a UPS to source and sink energy to and from a grid according to some embodiments.

According to further aspects of the inventive subject matter, a controller 740 for a UPS 730 and associated battery 710 along the lines described above may be configured to selectively provide bidirectional and unidirectional energy transfers between a battery bank or other energy storage device under various SOC conditions. Referring to FIG. 7, a battery 710 may have defined maximum and minimum active SOCs. The maximum active SOC may correspond to a SOC above which it is undesirable to further charge the battery 710, while the minimum active SOC may correspond to a level below which it is undesirable to discharge the battery 710 for purposes of delivering ancillary services, such as frequency regulation and peak shaving. The minimum active SOC is generally above a critical reserve SOC, which represents a minimum desirable SOC needed to assure a certain level of backup energy for maintaining the critical load connected to a UPS 730.

Figure 8:
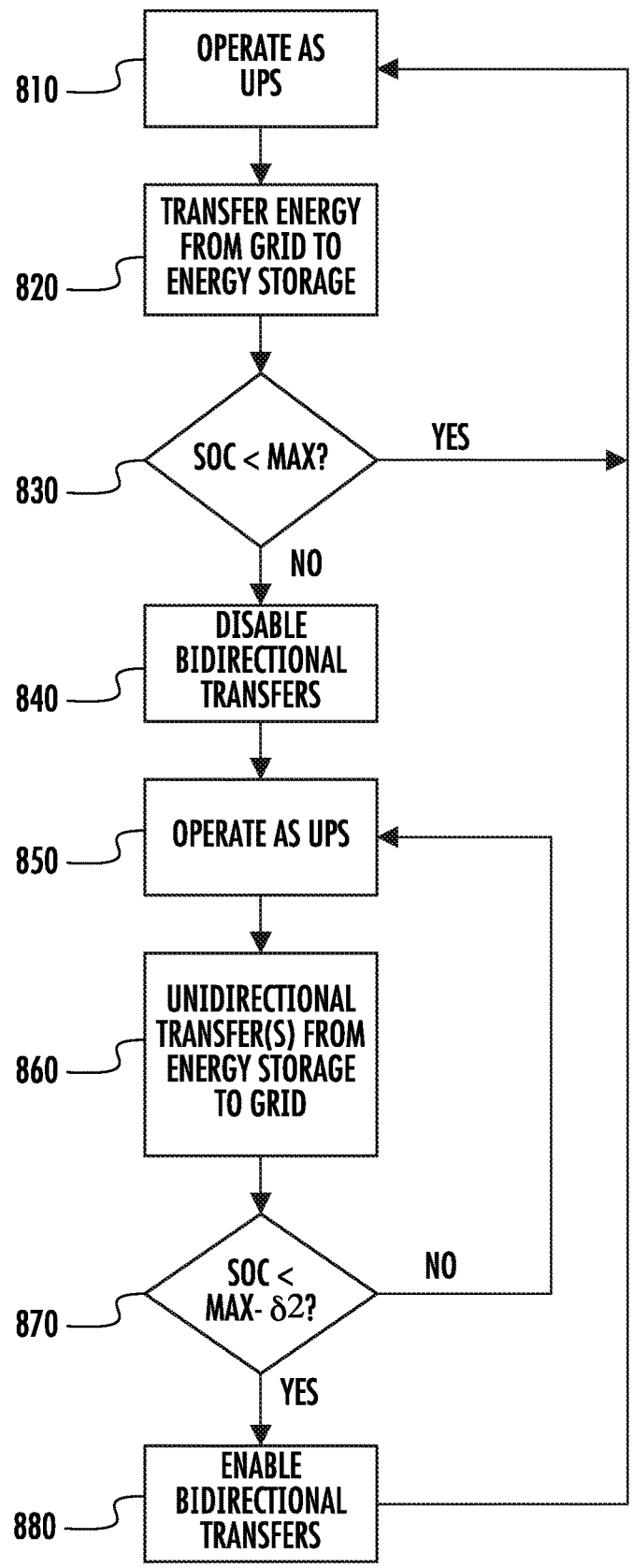
FIGS. 8 and 9 are flowcharts illustrating operations of the system of FIG. 7.

Referring to FIGS. 7 and 8, the controller 740 allows the UPS 730 to autonomously operate to provide backup capability for critical loads (block 810). Assuming the SOC of the battery 710 is at, for example, a midpoint between the minimum active SOC and the maximum active SOC, the controller 740 allows bidirectional transfers, i.e., it will comply with requests from a system operator 760 for transfers from the energy storage battery 710 to the grid 750 or from the grid 750 to the battery 710. Responsive to a request from the grid operator 760, for example, energy may be transferred from the grid 750 to the battery 710 via the UPS 730 to increase the SOC of the battery 710 (block 820). If the SOC remains less than the maximum active SOC, the controller 740 will continue to comply with similar requests for transfers from the grid 750 to the battery 710 (blocks 830, 810, 820). If, however, the SOC reaches the maximum active SOC, the controller 740 will begin to constrain the UPS 730 to unidirectional transfers, i.e., the controller 740 will begin to ignore requests from the system operator 760 for energy transfers from the grid 750 to the battery 710 while continuing to comply with requests to energy transfers from the battery 710 to the grid 750 (blocks 830, 840, 850, 860). If the SOC of the battery 710 falls an amount δ2 below the maximum active SOC (e.g., due to such a transfer to the grid 750 and/or a discharge of the battery 710 in providing power to a critical load connected to the UPS 730), the controller 740 re-enables compliance with requests for transfers from the grid 750 to the battery 710 (blocks 870, 880).

Figure 9:
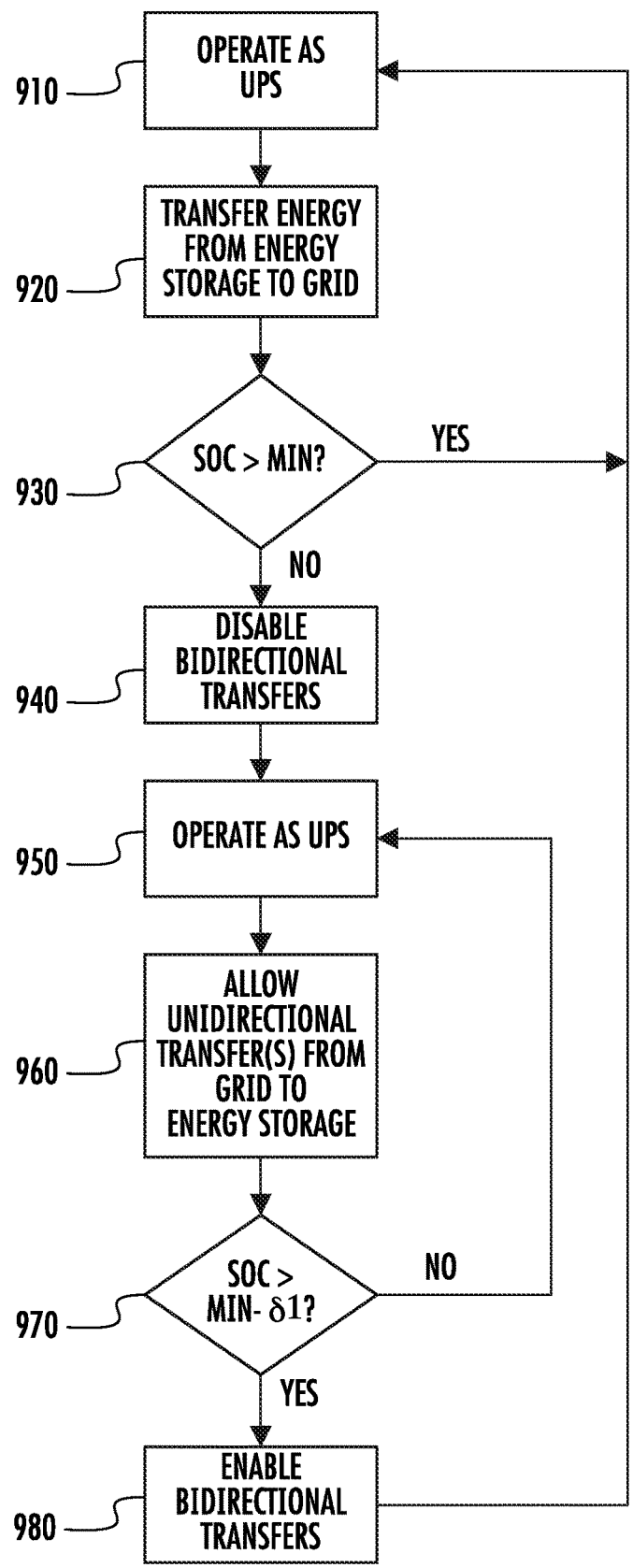

FIG. 9 illustrates similar operations relating to the minimum active SOC. Referring to FIGS. 7 and 9, the controller 740 allows the UPS 730 to autonomously operate to provide backup capability for critical loads (block 910). Assuming the SOC of the battery 710 is at, for example, a midpoint between the minimum active SOC and the maximum active SOC, the controller 740 will allow bidirectional transfers, i.e., it will comply to requests from the system operator 760 for transfers from the battery 710 to the grid 750 or from the grid 750 to the battery 710. Responsive to a request from the grid operator 760, for example, energy may be transferred from the battery 710 to the grid 750 to decrease the SOC of the battery 710 (block 820). If the SOC remains greater than the minimum active SOC, the controller 740 will continue to comply with similar requests for transfers from the battery 710 to the grid 750 (blocks 930, 910, 920). If, however, the SOC falls to the minimum active SOC (e.g., due to a transfer to the grid 750 or a transfer to a critical load of the UPS 730), the controller 740 will begin to constrain the UPS 730 to unidirectional transfers, i.e., the controller 740 will begin to ignore requests from the system operator 760 to transfer energy from the battery 710 to the grid 750 while continuing to comply with requests for transfers of energy from the grid 750 to the battery 710 (blocks 930, 940, 950, 960). If the SOC of the battery 710 increases to an amount δ1 above the minimum active SOC (e.g., as a result of such a transfer from the grid 750 to the battery 710), the controller 740 re-enables compliance with requests for transfers from the battery 710 to the grid 750 (blocks 970, 980).

Further embodiments of the inventive subject matter may alter operations along the lines discussed above with reference to FIGS. 7-9. For example, in some embodiments, thresholds, such as the minimum active SOC and/or the maximum active SOC may be modified based on various criteria. For example, if a UPS linking a battery bank to the grid is one of plurality of such UPSs at a given site and providing an aggregate DER as shown in FIG. 6, the minimum active SOC and/or the maximum active SOC may be adaptively modified based on, for example, cost factor, margins needed to maintain particular critical loads, etc.

According to further embodiments, the degree to which a UPS responds to a transfer request may also be varied. In some ancillary grid services regimes, for example, a DER is "graded" based on the quality of its responses to grid operator requests for energy transfers. According to some embodiment, a UPS's response to energy sourcing or sinking requests (e.g., for services such as peak shaving and frequency regulation) may, for example, be scaled based on various criteria, such as tailoring the response (e.g., only partially fulfilling a transfer request) of individual UPSs to such requests based on an aggregate index or score for the site used in the ancillary grid services scheme. In such an approach, for example, individual UPSs may scale their responses nonuniformly while still maintaining a desired aggregate performance.

The drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
    an uninterruptible power supply (UPS) configured to selectively provide energy to a critical load from a grid and an energy storage device and to transfer energy between the energy storage device and the grid; and
    a controller configured to cause the UPS to selectively support bidirectional and unidirectional transfers of energy between the grid and the energy storage device based on a state of charge (SOC) of the energy storage device, wherein the controller is configured to:
    when the SOC is greater than a maximum active SOC, ignore requests from a grid operator for energy transfers from the grid to the energy storage device and comply with requests from the grid operator for transfers from the energy storage device to the grid;
    when the SOC is less than a minimum active SOC, ignore requests from the grid operator for energy transfers from the energy storage device to the grid and comply with requests from the grid operator for energy transfers from the grid to the energy storage device; and
    when the SOC is between the maximum active SOC and the minimum active SOC, comply with requests from the grid operator for energy transfers from the grid to the energy storage device and requests from the grid operator for energy transfers from the energy storage device to the grid.

2. The system of claim 1, wherein the controller is configured to resume complying with requests from the grid operator for energy transfers from the grid to the energy storage device responsive to the SOC reaching a level a predetermined amount less than the maximum active SOC.

3. The system of claim 1, wherein the controller is configured to resume complying with requests from the grid operator for energy transfers from the energy storage device to the grid responsive to the SOC reaching a level a predetermined amount greater than the minimum active SOC.

4. The system of claim 1, wherein the minimum active SOC is greater than a critical reserve SOC representing an amount of energy allocated to providing backup energy for the critical load.

5. The system of claim 1, wherein the controller is configured to vary for transfer of energy received from the grid operator based on a performance criterion for a group of UPSs and energy storage devices connected to the grid such that the group of UPSs maintains a desired aggregate performance in response to the requests while allowing the UPSs of the group of UPSs to non-uniformly respond to the requests.

6. The system of claim 1, wherein the controller is configured to adjust a SOC range defined by the maximum active SOC and the minimum active SOC.

7. The system of claim 6, wherein the controller is configured to adjust the SOC range based on a performance criterion associated with the UPS.

8. The system of claim 7, wherein the UPS comprises one of a plurality of UPSs and wherein the controller is configured to adjust the SOC range based on a performance criterion associated with the plurality of UPSs such that the plurality of UPSs maintains a desired aggregate performance in response to the requests while allowing the UPSs of the plurality of UPSs to non-uniformly respond to the requests.

9. A method comprising:
    operating an uninterruptible power supply (UPS) to selectively provide energy to a critical load from a grid and an energy storage device and to transfer energy between the energy storage device and the grid; and
    causing the UPS to selectively support bidirectional and unidirectional transfers of energy between the grid and the energy storage device by selectively ignoring and complying with requests for energy transfers received from a grid operator based on a state of charge (SOC) of the energy storage device, wherein selectively ignoring and complying with requests for energy transfers received from a grid operator based on a state of charge (SOC) of the energy storage device comprises:
    when the SOC is greater than a maximum active SOC, ignoring requests from a grid operator for energy transfers from the grid to the energy storage device and complying with requests from the grid operator for transfers from the energy storage device to the grid;
    when the SOC is less than a minimum active SOC, ignoring requests from the grid operator for energy transfers from the energy storage device to the grid and complying with requests from the grid operator for energy transfers from the grid to the energy storage device; and
    when the SOC is between the maximum active SOC and the minimum active SOC, complying with requests from the grid operator for energy transfers from the grid to the energy storage device and requests from the grid operator for energy transfers from the energy storage device to the grid.

10. The method of claim 9, further comprising:
    complying with requests from the grid operator for energy transfers from the grid to the energy storage device to resume responsive to the SOC reaching a level a predetermined amount less than the maximum active SOC; and complying with requests from the grid operator for energy transfers from the grid to the energy storage device to resume responsive to the SOC reaching a level a predetermined amount greater than the minimum active SOC.

* * * * *